May 6, 1969 P. G. WOLFE 3,443,029

NOISE SUPPRESSION CIRCUIT

Filed June 15, 1966

INVENTOR.
PAUL G. WOLFE
BY Leonard Zalman
AGENT

United States Patent Office 3,443,029
Patented May 6, 1969

3,443,029
NOISE SUPPRESSION CIRCUIT

Paul G. Wolfe, Oreland, Pa., assignor to Philco-Ford Corporation, a corporation of Delaware Filed June 15, 1966, Ser. No. 557,747
Int. Cl. H04n *3/16, 5/38;* H03b *1/04*
U.S. Cl. 178—7.3 6 Claims

ABSTRACT OF THE DISCLOSURE

A noise suppression circuit wherein the control and common electrodes of a noise-gated amplifier are connected respectively to the common and control electrodes of another amplifier to which a noisy signal is supplied. Due to these connections, biasing of the other amplifier to a desired threshold conduction voltage automatically biases the noise-gated amplifier so that it has the proper threshold conduction voltage. The threshold conduction voltage of the noise-gated amplifier can be modified by connecting one or more diodes between the common electrode of the other amplifier and the control electrode of the noise-gated amplifier. The output signals of the two amplifiers are summed to produce a composite output signal having inverted noise components which can be removed easily from the composite output signal.

The video detector of a television receiver develops a composite output signal comprising video information components, synchronizing signal components separated in magnitude from the video information components, and unwanted noise components having magnitudes generally greater than those of the synchronizing signal components. Since the noise components interfere with the clarity of the video reproduction, it is desirable to reduce the effects of the noise components. To reduce the effect of the noise components some television broadcast stations have increased the signal strength at the transmitter. The increase in signal strength at the transmitter raises the signal to noise ratio at each receiver and thereby eliminates the adverse effect of some noise. The increase in signal strength however requires costly equipment installations at the transmitter and merely moves the area of fringe reception further from the transmitter without eliminating the noise problems for such fringe areas.

A different approach to noise reduction is to suppress the noise at the receiver. Two methods are currently employed for suppressing the noise components at the receiver and more particularly from the output of the video detector. These two methods involve noise gating and noise inverting.

In the noise gating circuits of the prior art, a switching device is biased to conduct when the amplitude of the composite signal from the video detector does not exceed the amplitude of the video or synchronizing components but is biased to non-conduction in response to a signal amplitude in excess of that of the synchronizing components. The output of the switching device will therefore be devoid of large amplitude noise pulses.

In the noise inverter circuits of the prior art, the composite signal from the video detector is transmitted to the control electrode of a video amplifier and to the control electrode, usually the cathode, of a noise gated tube amplifier. The video amplifier is biased so that it will amplify only those signals in the amplitude range from zero to the amplitude of the synchronizing signal. The noise gated amplifier is biased so that it will conduct only when a signal having an amplitude greater than that of the synchronizing signal is applied to its control electrode. The outputs of the video amplifer and of the noise gated amplifiers are then combined so that the output of the noise gated amplifier subtracts from the output of the video amplifier. The noise inverter circuits of the prior art have the drawback of requiring bias sources for the video amplifier and the noise gated amplifier which track the amplitude of the synchronizing pulses and a separate source of biasing potential for adjusting the threshold voltage of the noise gated amplifier. The prior art also requires critical set-up adjustment of the threshold conduction voltage of the noise gated tube amplifier.

According to the present invention, the disadvantages of the prior art are overcome by providing a noise inverter circuit in which the noise gated amplifier is connected to the video amplifier so that the control and common electrodes of the amplifiers are supplied from the same source but in opposite polarity. Preferably, the control electrode of the noise gated amplifier is connected to he common electrode of the video amplifier and the control electrode of the video amplifier is connected to the common electrode of the noise gated amplifier. The circuit of the present invention will completely remove noise components of large magnitude and is more economical than prior art systems because a separate source of biasing potential and set-up adjustments are not required for the nose gated amplifier.

An object of the present invention is to obtain improved noise suppression in a television receiver.

Another object of the present invention is to obtain improved noise supression in a television receiver having an economy of parts.

Another object of the present invention is to obtain improved noise suppression in a television receiver by having common input signal connections between the video amplifier and a noise gated amplifier.

The above objects and other objects inherent in the present invention will be more apparent when read in conjunction with the following specification and drawings in which.

Figure 1:
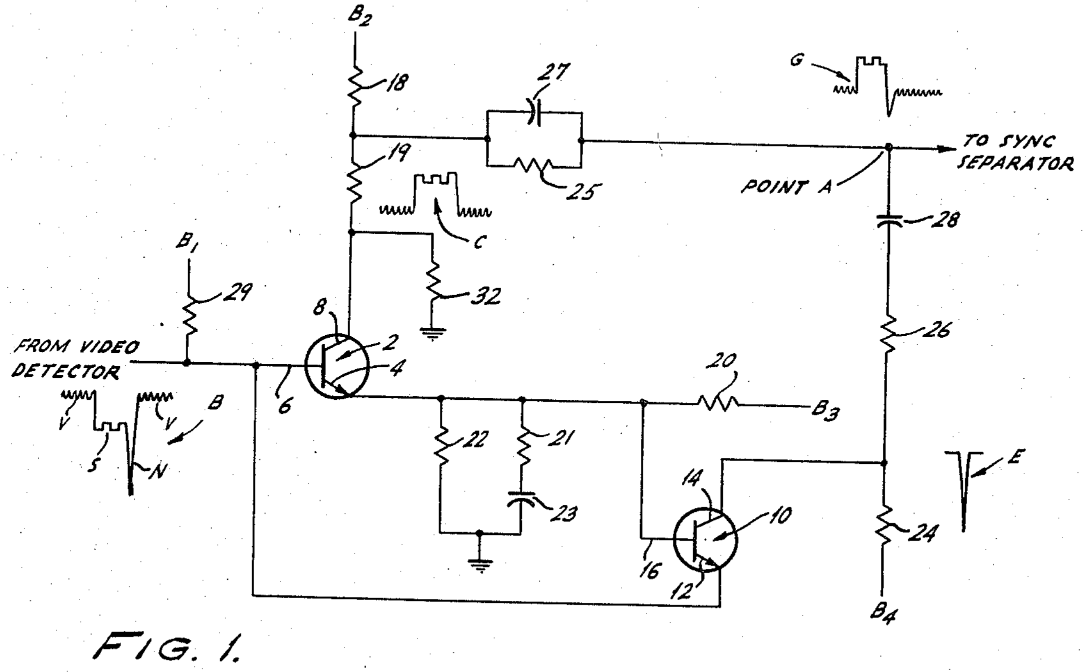
FIGURE 1 is a schematic diagram of the improved noise suppression circuit of the present invention.

Referring to FIG. 1 there is shown an N-P-N transistor 2 having an emitter electrode 4, a base electrode 6, and a collector electrode 8. The transistor 2 is operated as a video amplifier. A second N-P-N transistor 10 having an emitter electrode 12, a collector electrode 14 and a base electrode 16 has its base electrode 16 connected to the emitter electrode 4 of transistor 2. The base or control electrode 6 of transistor 2 is connected to the emitter or common electrode 12 of transistor 10 and to the output of a video detector. It is also connected to a bias source $B_1$ through a resistor 29 to provide an appropriate operating bias at the base 6 and emitter 12. The collector electrode 8 of transistor 2 is connected through series connected resistors 18 and 19 to a biasing source $B_2$ and through resistor 32 to ground. The resistors 18, 19, and 32 provide an appropriate operating bias at the collector 8 of transistor 2. The emitter electrode 4 of transistor 2 and, obviously, the base electrode 16 of transistor 10 are connected through a resistor 20 to a bias source $B_3$. The emitter electrode 4 of transistor 2 and the base electrode 16 of transistor 10 are also connected through a resistor 22 to ground and through series connected resistor 21 and capacitor 23 to ground. The resistors 20, 21, and 22 provide appropriate operating bias at the electrodes 4 and 16. Capacitor 23 helps maintain the output of the video amplifier 2 constant at high input frequencies.

The collector electrode 14 of transistor 10 is connected through a load resistor 24 to a biasing source $B_4$. The collector electrode 14 of transistor 10 is also connected through series connected resistor 26 and capacitor 28 to a junction point A. The junction of resistors 18 and 19 is also connected to junction point A through parallel connected resistor 25 and capacitor 27. Point A may be connected to the input of a synchronizing signal separator to supply a relatively noise free signal thereto.

The values of the bias source $B_3$, the bias source $B_4$, and resistors 20, 22 and 29 are chosen so that the threshold voltage of transistor 10 is not achieved until the transistor 2 has been driven below its threshold voltage. The threshold voltage of the transistor 2 is chosen to be the amplitude of the sychronizing signal voltage. Therefore, when a composite signal from the video detector is received at the base electrode 6 of transistor 2, the transistor 2 conducts for the video, and synchronizing signal components of the waveform but will not conduct for signal amplitudes, i.e. noise peaks, more negative than the synchronizing signal components.

By connecting the transistors 2 and 10 back to back, that is, the base electrode 6 of transistor 2 is connected to the emitter electrode 12 of transistor 10 and the base electrode 16 of transistor 10 is connected to the emitter electrode 4 of transistor 2, a fixed offset voltage is built into the circuit and no set-up adjustment is required. The offset voltage is the result of the forward blocking potential inherent in a semiconductor junction. A more complete explanation of the offset voltage can be obtained by reference to FIG. 3 which is a curve showing the change in amplitude in volts of a composite video detector signal having video components V, synchronizing components S, and noise components N as a function of time. If the theoretical transition voltage at which the conduction of transistor 2 ceases and the conduction of transistor 10 begins is arbitrarily assigned the value X, then a voltage range of 2Y will actually exist between the transition from conduction of transistor 2 to the conduction of transistor 10. The voltage Y is due to the inherent forward blocking potential of the emitter-base junction of each transistor 2 and 10, which, for example, is .6 volts for a silicon transistor. Since the operation of each transistor is mutually exclusive of the operation of the other, the blocking potential of the two transistors is additive and equal to 2Y. Therefore neither transistor will conduct for signal components having a magnitude $X \pm Y$. If transistors 2 and 10 are both of silicon, the blocking potential of the two would be 1.2 volts.

Figure 3:
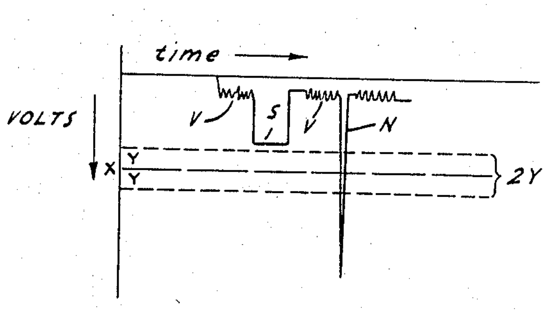
FIGURE 3 is a graph illustrating the improved switching action of the circuit of the present invention.

One of the advantages of the circuit of FIG. 1 is that it does not require exact adjustment of the voltage X shown in FIG. 3. If the maganitude of the sychronizing pulses should become slightly more negative, the built-in offset voltage 2Y will prevent the synchronizing pulses from being inverted. Likewise, if the magnitude of the voltage X should shift to a more negative voltage due to the inherent differences of circuit elements in mass production techniques, the built in offset voltage will still block noise pulses slightly more negative than the magnitude of the synchronizing signal components.

Referring again to FIG. 1, if the output of the video detector 3 has the waveform B containing video components V, synchronizing components S, and noise components N, waveform C will appear at the collector electrode 8 of transistor 2. The waveform C contains only a clipped portion of the noise components. The waveform C also contains the video and synchronizing signal components and is 180° out of phase with the corresponding components of waveform B. When a noise pulse having an amplitude greater than the sum of the amplitudes of the synchronizing signal and the offset voltage is applied to the emitter electrode 12 of transistor 10, a waveform containing only noise components will appear at the collector electrode 14 of transistor 10. The output signal at collector electrode 14 of transistor 10 has a waveform designated by E and contains only noise components in phase with the noise components of the video detector composite signal waveform B. The waveforms C and E are added at point A to produce waveform G which is a composite of waveforms C and E. For very large noise pulses, i.e. noise pulses having an amplitude at least twice that of the synchronizing pulses, the waveform G is seen to contain an inverted noise component which can be easily removed from the video and synchronizing signals. Inversion of the noise components will prevent erroneous signals from activating the sync separator and the automatic gain control networks of the television receiver.

Figure 2:
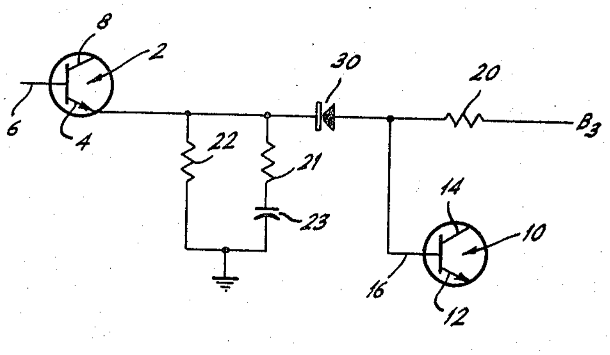
FIGURE 2 is a partial schematic diagram of a modified circuit of the invention of FIGURE 1.

Referring to FIG. 2, there is shown a partial schematic of another embodiment of the present invention in which a diode 30 has been added to the embodiment of FIG. 1. Components corresponding to those of FIG. 1 are designated with the same reference numerals. In the embodiment of FIG. 2, the diode 30 is connected between the emitter electrode 4 of transistor 2 and the base electrode 16 of transistor 10. The diode 30 has its anode connected to the base electrode 16 of transistor 10. Diode 30 makes the potential at the base electrode 16 of transistor 10 less negative than the potential at the emitter electrode 4 of transistor 2 by an amount equal to the forward blocking voltage of the diode. Thus the voltage range 2Y of FIG. 3 is reduced by the forward blocking voltage of diode 30. With the diode 30, the transistor 10 can be triggered to conduction by a smaller noise pulse. More than one diode 30 can be connected in series if a still smaller threshold voltage is desired for the transistor 10.

It can therefore be seen that the present invention has the advantages of not requiring additional independent biasing networks for the video amplifier and the noise gated inverter amplifier. The elimination of the additional biasing means reduces the number of components needed to achieve noise inversion and is therefore more economical than prior art systems. The circuit of the present invention can also be operated without set-up adjustments due to the novel connection between the emitter and base electrodes of the video and inverter amplifiers.

By way of example, in one physical embodiment of the invention as shown in FIG. 1, the components of the noise inverter circuits are as follows:

| | | |
|---|---|---|
| Transistor **2** | | SE7010 |
| Transistor **10** | | ES1001 |
| Resistor **20** | ohms | 680 |
| Resistor **29** | do | 1K |
| Resistor **22** | do | 270 |
| Resistor **32** | do | 90K |
| Resistor **18** | do | 470 |
| Resistor **19** | do | 7.5K |

While the circuits of the present invention have been shown to include components of certain type and configuration it will be apparent to one skilled in the art that various modifications and departures can be made without departing from the scope of the present invention.

What is claimed is:

1. In a television receiver, a noise suppressor circuit comprising: a source providing video, synchonizing, and unwanted noise pulses, a first transistor having base, emitter, and collector electrodes, a second transistor having base, emitter, and collector electrodes, said emitter electrode of said first transistor being connected to said base electrode of said second transistor and to a first voltage divider network, said first voltage divider network comprising two resistors connected in series, the junction of said resistors being connected to said emitter electrode of said first transistor, said base electrode of said first transistor being connected to said emitter electrode of said second transistor and to said source, said collector electrode of said first transistor being connected to a second voltage divider network, a point on said second voltage divider network being connected through an adder network to said collector electrode of said second transistor, said adder network comprising a parallel connected resistor and capacitor connected in series with a series connected resistor and capacitor, and means for biasing said first and second transistors so that said first transistor conducts only for video and synchronizing pulses from said source and said second transistor conducts only for noise pulses from said source.

2. In a television receiver, a noise suppression circuit comprising a first amplifier having output, common and control electrodes, means for supplying to said control electrode of said first amplifier a signal which contains desired voltage pulses having an amplitude equal to or less than a given absolute value and which also may contain unwanted noise pulses having amplitudes greater than said absolute value, a second amplifier having output, common and control electrodes, means for coupling said common electrode of said first amplifier to said control electrode of said second amplifier, means for connecting said control electrode of said first amplifier to said common electrode of said second amplifier, means for biasing said first amplifier so that it conducts only when said desired pulses are supplied thereto and for biasing said second amplifier so that it conducts only when said first amplifier is not conducting, and means for combining the output signals of said amplifiers.

3. The circuit of claim 2 in which said means for coupling said common electrode of said first amplifier to said control electrode of said second amplifier includes at least one diode, and said control electrode of said first amplifier is connected directly to said common electrode of said second amplifier.

4. The circuit of claim 3 in which said first and second amplifiers respectively comprise first and second transistors each of which comprises an emitter electrode, a collector electrode and a base electrode, and in which said control electrode, said common electrode, and said output electrode of each of said amplifiers are said base, emitter and collector electrodes, respectively, of said transistor thereof.

5. The circuit of claim 4 in which said means for combining said output signals of said two amplifiers includes a resistance-capacitance network connected between said collector electrodes of said transistors.

6. The circuit of claim 5 in which the cathode of said diode is coupled to said emitter electrode of said first transistor and the anode of said diode is coupled to said base electrode of said second transistor and both of said transistors are N-P-N transistors.

References Cited

FOREIGN PATENTS 549,041 10/1956 Italy.

ROBERT L. GRIFFIN, *Primary Examiner.*

R. L. RICHARDSON, *Assistant Examiner.*

U.S. Cl. X.R.

328—165